(12) United States Patent
Diemer et al.

(10) Patent No.: US 6,905,010 B2
(45) Date of Patent: Jun. 14, 2005

(54) FRICTION CLUTCH ASSEMBLY

(75) Inventors: Matthias Diemer, Niederwerrn (DE); Ingrid Hoffelner, Knetzgau (DE); Andreas Orlamünder, Schweinfurt (DE); Jürgen Frieg, Röthlein (DE); Jens Kelter, Kitzingen (DE)

(73) Assignees: ZF Sachs AG, Schweinfurt (DE); Sachs Giesserei GmbH, Kitzingen (DE)

( * ) Notice: Subject to any disclaimer, the term of this patent is extended or adjusted under 35 U.S.C. 154(b) by 54 days.

(21) Appl. No.: 10/401,355

(22) Filed: Mar. 28, 2003

(65) Prior Publication Data

US 2003/0213669 A1 Nov. 20, 2003

(30) Foreign Application Priority Data

Apr. 2, 2002 (EP) .............................. 02007271

(51) Int. Cl.⁷ .............................................. F16D 13/70
(52) U.S. Cl. .............................. 192/70.14; 192/107 M; 192/113.21
(58) Field of Search .......................... 192/107 M, 70.2, 192/89.23, 70.27, 70.14, 113.21, 113.26

(56) References Cited

U.S. PATENT DOCUMENTS

| | | | |
|---|---|---|---|
| 2,685,947 A | * 8/1954 | Votrian ................... | 192/113.21 |
| 3,584,718 A | 6/1971 | Schiefer et al. .......... | 192/70.14 |
| 4,422,538 A | 12/1983 | Krumm .................... | 192/70.14 |
| 5,261,511 A | * 11/1993 | Libsch et al. ........... | 192/107 M |
| 5,526,914 A | * 6/1996 | Dwivedi et al. ......... | 192/107 M |
| 6,202,820 B1 | * 3/2001 | Peinemann et al. ..... | 192/107 M |
| 6,352,147 B1 | * 3/2002 | Orlamunder et al. ... | 192/107 R |
| 6,564,919 B2 | * 5/2003 | Diemer et al. .......... | 192/107 M |
| 2003/0164274 A1 | * 9/2003 | Feldhaus et al. ....... | 192/107 M |

FOREIGN PATENT DOCUMENTS

| | | | |
|---|---|---|---|
| DE | 35 42 847 | 6/1987 | ........... F16D/13/40 |
| EP | 0 022 071 | 1/1981 | ........... F16D/13/60 |
| GB | 2 150 654 | 7/1985 | ........... F16D/13/50 |

OTHER PUBLICATIONS

Patent Abstracts of Japan, vol. 018, No. 616, Nov. 1994, Publication No. 06238389.

* cited by examiner

Primary Examiner—Richard M. Lorence
(74) Attorney, Agent, or Firm—Cohen, Pontani, Lieberman & Pavane

(57) ABSTRACT

A friction clutch assembly has a clutch housing, at least one first friction plate, which is connected in a rotationally fixed manner to the clutch housing and can be displaced in axial direction therein, and a second friction plate, which bears the clutch housing. At least one driver disk is arranged axially adjacent to the first and second friction plates and has friction linings on both sides, which interact with the friction plates, and a spring which can apply a compressive force for actuation of the clutch to the at least one first friction plate. At least one of the friction plates is made at least in part from a metal matrix and at least one nonmetallic foreign phase included in the matrix, which together form a metal matrix composite material. In a further aspect of the invention, the clutch housing is likewise formed from a metal matrix composite material.

27 Claims, 16 Drawing Sheets

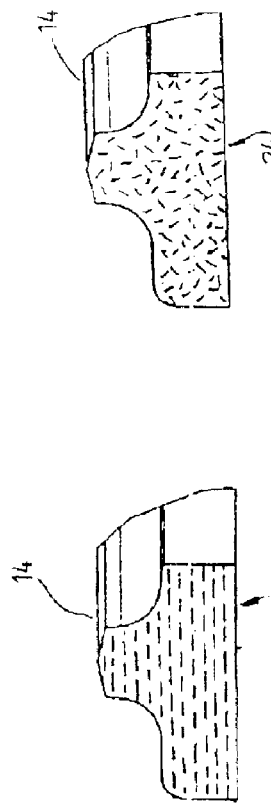
Fig. 11a
Fig. 11b
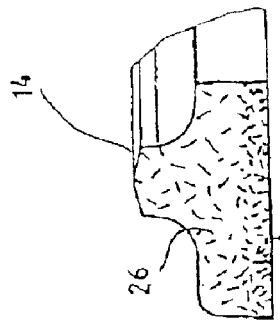
Fig. 11c
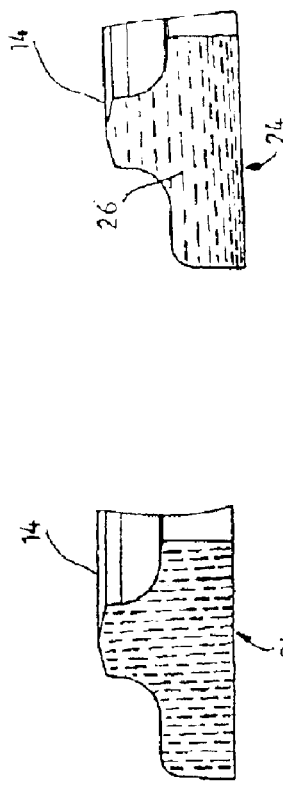
Fig. 11d
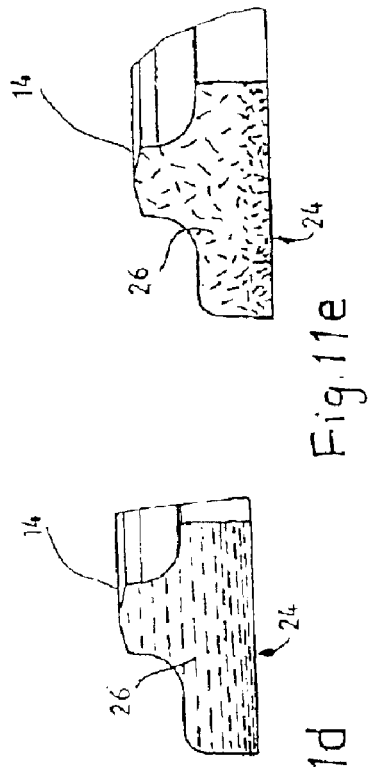
Fig. 11e

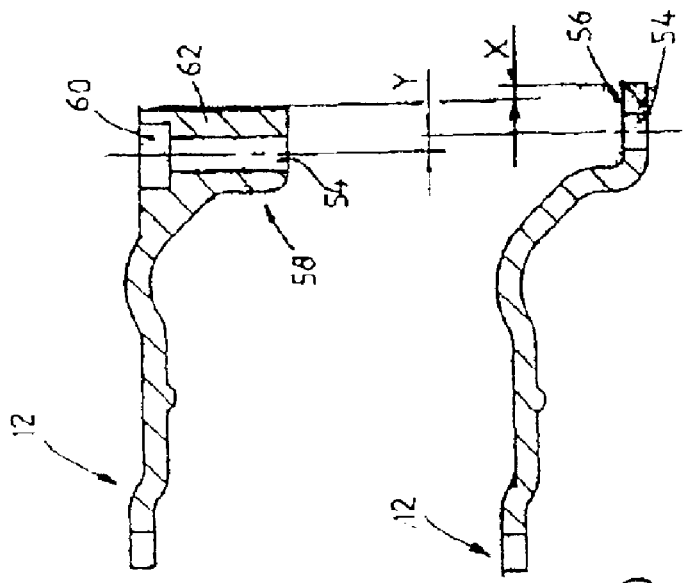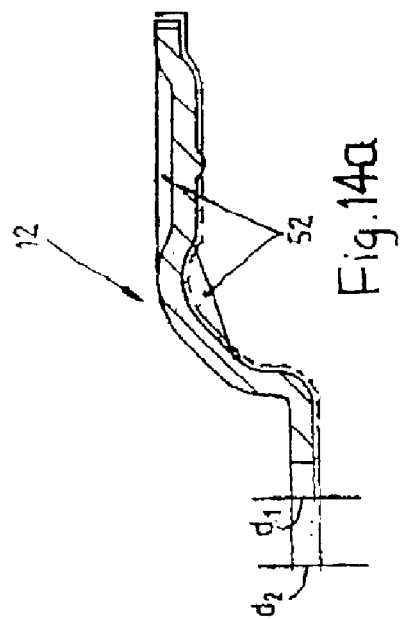

FRICTION CLUTCH ASSEMBLY

BACKGROUND OF THE INVENTION

1. Priority Claim

Priority is claimed for this invention and application, a corresponding application having been filed in Europe on Apr. 2, 2002, No. 02007271.6.

2. Field of the Invention

The invention relates to a friction clutch assembly, in particular for motor vehicles, including a clutch housing, at least one first friction plate in the housing, and a second friction plate bearing the clutch housing, wherein the first pressure plate is rotationally fixed and axially displaceable with respect to clutch housing. At least one driver disk is arranged axially adjacent to the at least one first friction plate and the second friction plate and has oppositely facing friction linings which interact with the adjacent friction plates, and a spring loads the at least one friction plate toward the second friction plate. 3. Description of the Related Art In friction clutches of this type, it is preferable to use organically bonded friction linings which are arranged on driver disks and act against metallic friction plates in the form of the pressure plate and the flywheel. In passenger automobile clutches, the friction material used is usually the gray cast iron designated GG, GGV or GGG. The rotating components pressure plate and flywheel, in operation, are subject to very high mechanical loads which substantially result from the centrifugal force, which is directly proportional to the material density. Gray cast iron, with a density of 7.2 kg/dm$^3$, has a limited strength of approx. 250 MPa to 400 MPa, which is dependent on the quality. Therefore, a strength to density ratio which is relatively low and unfavorable for use as clutch material is present.

As an alternative to cast materials, if space is limited or if there are high demands on strength, for example high acceleration demands, steel is increasingly being used for one friction plate. Steel generally has a higher strength but this is partly offset by the increased density compared to gray cast iron of 7.85 kg/dm$^3$.

The components of a friction clutch are generally to be designed in such a way that the quantity of heat which is produced when the clutch is operating can be taken up and dissipated by these components without overheating and without the frictional properties being adversely affected. The design of the friction plates used, i.e. the material thickness and therefore the mass of the components, is therefore predominantly determined by the heat capacity of the material used. Gray cast iron and steel have approximately the same heat capacity of approx. 500 J·kg$^{-1}$·K$^{-1}$. Lighter structures, as are increasingly required in consumption-optimized vehicles, for high-acceleration applications and for rotary inertia compensation for new types of components in the drive train, for example a starter generator or a double clutch, cannot consistently be implemented with the above-mentioned materials.

A further significant physical variable in a friction clutch is the thermal conductivity of the friction plates. Gray cast iron and steel have similar thermal conductivities at approx. 50 W·m$^{-1}$K$^{-1}$. With a similarly low thermal conductivity at this level, it is often not possible for the frictional heat which is produced to be dissipated sufficiently quickly from the friction region, and consequently heat may build up, in which case the temperature of the friction region can very quickly reach high levels. This effect can lead to a significant curvature (shielding) of the pressure plate and to a sudden deterioration in the friction properties (fading) and may even result in complete failure of the friction clutch.

Furthermore, gray cast iron and steel are also limited in terms of their wear resistance, which means that the use of tribologically favorable but aggressive friction linings, e.g. sintered metallic materials, on the driver disk is only permitted to a limited extent. The abrasion of a passenger automobile clutch over an assumed service life of approx. 200,000 km is approximately 0.3 to 0.5 mm.

To satisfy the high surface demands, friction plates made from gray cast iron or steel have to undergo finish machining. This operation may disadvantageously lead to distortion of the friction plate. The high manufacturing costs incurred are a further drawback.

This results in the object of proposing a friction clutch arrangement using a material which is able to satisfy the high demands imposed during operation of a friction clutch arrangement and, at the same time, results in a weight saving compared to conventional materials.

SUMMARY OF THE INVENTION

The object is achieved by making at least one friction plate at least in part from a metal matrix composite material having at least one nonmetallic foreign phase included in the matrix. The use of a metal matrix composite material (MMC) makes it possible to combine on the one hand the benefits of the metal, in particular its low density, high ductility and excellent thermal conductivity and, on the other hand, the benefits of nonmetallic materials, in particular their high strength, high rigidity and high wear resistance, as well as the low thermal expansion. The result is a friction clutch arrangement in which a friction plate has a wear resistance which is increased compared to the materials which have previously been used for this component, the friction plate also having a lower mass and being able to optimally withstand the high operating loads on account of its high strength.

A metal matrix composite material can also advantageously be used for the clutch housing. By way of example, although a clutch housing with a predetermined rigidity would require a material thickness which is greater by a factor of 1.28 when the composite material Duralcan with a modulus of elasticity of 1 Gpa is used compared to the standard seal material with a modulus of elasticity of 210 GPa, this nevertheless gives a considerable weight advantage of approximately 55% compared to the steel housing.

The advantages which result from the use of a metal matrix composite material are to be presented, by way of example, on the basis of an aluminum alloy reinforced with 20% by volume of SiC, known as DURALCAN F3S.

Table 1 below in this connection gives some of the physical material properties which are of relevance for a friction clutch:

TABLE 1

| | Density $\rho$ kg/dm$^3$ | Thermal conduction $\lambda$ W/mK | Heat capacity c J/kgK | Heat capacity c$^1$ J/dm$^3$K | Thermal diffusitivity a = $\lambda$/c*$\rho$ m$^2$/s |
|---|---|---|---|---|---|
| Gray cast iron | 7.25 | 58 | 500 | 3625 | 1.6E–05 |
| Al-MMC 20% SiC | 2.77 | 185 | 921 | 2551.17 | 7.3E–05 |
| Factor (Duralcan GG) | 0.4 | 3.2 | 1.842 | 0.704 | 4.5 |

Sources: Bosh Handbook (GG) Alcan Brochure (Duralcan)

Data for gray cast iron: Bosch, Kraftfahrtechnisches Taschenbuch (Automotive Handbook, 21st Edition, page 178; data for Al-MMC: Alcan, Duralcan information brochure, 1996

If, in comparing the materials, the starting point used is initially friction plates of the same mass, the aluminum composite material is able to store a quantity of heat which is greater by a factor of 1.8. This means that a start-up operation, which with a conventional pressure plate leads to a temperature increase of 200 K, heats an aluminum pressure plate of the same mass by only 111 K, leading to a significantly reduced wear and also to a reduced likelihood of fading in, for example, organic friction linings of the driver disk. On the other hand, an alternative result is that to take up an identical quantity of heat the mass of the aluminum composite material can be almost halved compared to gray cast iron, and in this way a considerable weight saving can be achieved.

The thermal conductivity and the thermal diffusivity of the aluminum composite material are higher than those of gray cast iron by a factor of 3.2 and 4.5, respectively. If one works on the basis of pressure plates of the same volume, which are intended to be at the same final temperature after the friction operation, the aluminum composite material can take up only approximately 70% of the quantity of heat taken up by gray cast iron. If, as a result of a friction operation, the temperature of a gray cast iron reference part is increased by a temperature difference $\Delta T$, the temperature of a replacement pressure plate at the same volume made from the aluminum composite material rises by a factor of $1.42 \cdot \Delta T$. This latter consideration, which is given purely as a formal calculation, means that initially the use of the aluminum composite material as material for a friction plate of a friction clutch is somewhat unpromising, since in the event of temperature rise there is generally a risk of a deterioration in the frictional properties and therefore in limited operation being possible.

In the text which follows, the application will refer to some of its own tests carried out in connection with the profile of the friction surface temperature as a function of the friction time in a passenger automobile clutch; these tests have assumed a constant frictional power of 80 W/cm$^2$.

FIG. 15 is a plot of surface temperature as a function of the friction time in a passenger automobiles clutch.

Three pressure plates were compared, of which one pressure plate is made from gray cast iron (GG), one pressure plate of the same volume is made from Al-MMC and a further pressure plate is made from AL-MMC with a material thickness of 142%. It can be seen from FIG. 1 that with short friction times the Al-MMC pressure plates have a friction-surface temperature which is up to 35 K lower than the GG pressure plate. The AL-MMC pressure plate of the same volume, which has only 40% of the mass of the GG pressure plate, has a lower friction surface temperature during friction operations which last less than 3.4 seconds. Only thereafter does the lower thermal storage capacity come to bear, leading, in the event of a prolonged friction operation, to an increased friction surface temperature. Although the AL-MMC pressure plate with the same thermal storage capacity has a starting volume which is 42% higher, its mass is only 54% of that of the GG pressure plate. During friction operations which last less than 7 seconds, this pressure plate has in comparative terms the most favorable thermal characteristics. From this, it can be concluded that a metal matrix composite material, contrary to the result of the formal calculation which was introduced at the outset, is eminently suitable as a material for a friction plate of a friction clutch arrangement.

Further tests carried out by the applicant have made it clear that the lower thermal conductivity of gray cast iron compared to AL-MMC leads to a relatively high temperature gradient in the direction of the friction surface normal in a GG pressure plate at the start of the friction operation and with only short friction times. By contrast, only a relatively shallow temperature gradient can form in an AL-MMC pressure plate. It is therefore possible to form a heat-accumulation region at a certain distance from the friction region, for example at the internal diameter of the pressure plate. This position is particularly favorable with a view to keeping the mass moment of inertia of the clutch arrangement as low as possible. The frictional heat which is produced reaches the whole of the available heat-accumulation region within a very short time. Since the shielding of the pressure plate is substantially dependent on the temperature gradient formed, it is also possible to expect an improvement in the reversible and irreversible shielding characteristics of a friction plate as a result of the use of Al-MMC.

In addition to the heat benefits, the aluminum-MMC material is also favorable in terms of its own wear, since the ceramic phase in the microstructure increases the resistance to abrasive attack from the friction lining.

Further tests carried out by the applicant have demonstrated that the friction level of a friction plate made from Al-MMC is still as high as with a conventional lead-free friction lining. The wear to the organic quality which has been measured in fatigue tests is particularly low.

The low density of AL-MMC leads, under the action of centrifugal force, to a significantly reduced load and stress compared to a comparative component made of gray cast iron. The resistance to rupturing is considerably increased.

A further effect of the lower density is the reduced balancing outlay for the finished component, since an identical volume error leads only to an unbalance which is lower by the density ratio factor.

Therefore, there is a wide range of resulting applications for the friction clutch arrangements according to the invention. Examples which may be mentioned include:

double clutches in which it is necessary to reduce the moment of inertia;

systems with further components which already take up part of the acceptable total moment of inertia;

vehicles with high demands for a light weight;

vehicles with high acceleration demands applications where thermally induced wear and fading are critical; and systems with high demands imposed on the wear resistance of the friction plate.

Further advantages and effects of refinements of the invention are explained below.

It is generally advantageous for a light metal or a light metal alloy which is based on at least one of the elements aluminum, magnesium or titanium to be selected as the metal matrix. Alloying systems of this type have been the subject of very in-depth research in terms of their materials properties and production processes and are already known from numerous applications.

A particularly suitable foreign phase is high-melting oxides, carbides, borides or nitrides, in particular $Al_2O_3$, AlN, $B_4C$, $Si_3N_4$, SiC, Sialon, $TiB_2$, $ZrO_2$.

The following phase is advantageously incorporated in the metal matrix in the form of discrete non-woven fibers.

In particular with a view to areal reinforcement of the matrix, it is recommended to use the fibers to form a woven fabric-like structure, for example in the form of a mesh.

Furthermore, it is appropriate for different regions on a friction plate, which can be used to realize different functions, also to be formed differently in terms of design or material microstructure. Therefore, a friction plate may have at least one friction region and a heat-accumulation region, the content by volume of the nonmetallic foreign phase in the at least one friction region being higher than that in the heat-accumulation region. When a metal matrix composite material is being used, it is firstly possible to noticeably increase the thermal conductivity of the heat accumulator with virtually the same heat capacity and also to dissipate the frictional heat generated in the friction region quickly and without any significant formation of a build-up of heat from the friction region into the heat-accumulation region. Secondly, the higher concentration by volume of the reinforcing foreign phase in the friction region leads to an improvement in the wear resistance.

The clutch arrangement according to the invention can be designed as a single-disk clutch but also as a multidisk clutch with a plurality of friction plates as pressure plates. The pressure plates arranged on the axially inner side are subject to particularly high thermal loads. The surface area can be increased on these pressure plates by means of recesses, with the result that a cooling structure is formed, in order to dissipate the frictional heat which is formed more effectively.

In terms of manufacturing technology, a wide range of casting processes can be used to produce a friction plate. Compared to gray cast iron, which cannot be used in all the processes, it is possible, for example, to use pressure die casting, gravity die casting, sand casting, centrifugal casting or a thixocasting process.

The materials and processes which have been mentioned for a friction plate are equally suitable for the production of the clutch housing.

A particularly sharp boundary between the friction region and the heat-accumulation region can be achieved if the friction region is produced by a surface treatment of the heat-accumulation region. All suitable techniques, e.g. laser powder coating, plasma spraying or the like, can be used for this purpose.

In a preferred refinement of the invention, the second friction plate is arranged, by securing means, on the flywheel of an internal combustion engine or on a secondary flywheel.

As an alternative, it is also possible to produce a particularly compact functional unit comprising a flywheel or a secondary flywheel and the second friction plate by casting them together.

In the case of pressure plates, it has hitherto been customary to interrupt, in the circumferential direction, the diaphragm-spring-cutting edge which is formed thereon and thereby to create air-passage openings for the purpose of cooling the friction clutch arrangement. In the case of a friction plate made from a metal matrix composite material, it is possible for the diaphragm-spring cutting edge to be continuous in the circumferential direction, on account of the better thermal properties compared to gray cast iron. As a result, the bearing surface area for the diaphragm spring is increased and the risk of the diaphragm-spring-cutting edge working its way into the diaphragm spring is reduced.

In an advantageous refinement of the invention, it is provided that a friction plate has, at the outer circumference, a plurality of radial projections, which extend through openings in the clutch housing and in the process form a forced-cooling device. At the rotational speeds of a motor vehicle clutch which occur in operation, specifically in the range from approx. 500 $min^{-1}$ to 7000 $min^{-1}$ or even higher, a very high ventilation effect is achieved in order to cool the clutch arrangement.

It is an advantage in terms of manufacturing technology for a rivet stud to be cast into a friction plate in order to receive a leaf-spring bore during the casting operation for production of the friction plate. As a result, the number of parts can be reduced during assembly of the clutch.

The clutch housing may advantageously have reinforcing ribs. In this case, the use of material required in order to achieve a predetermined strength can be reduced further and the clutch housing can be produced with a lower weight.

In the case of a clutch housing which is produced, for example, from a metal matrix composite material using the pressure die casting process, it is easily possible to form an accumulation of material, which has a screw-head-bearing region and a screw-shank-receiving region, in a radially outer region. This configuration enables the screw head of a screw connection which is intended to connect the housing to the second friction plate or the flywheel to be axially displaced into a region in which there is a certain amount of free space, so that the space which is released as a result can be utilized in some other way.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1b is an enlarged view of the pressure plate shown in FIG. 1a;

FIG. 2b is a section view of the friction plate of FIG. 2a;

FIG. 6b is a section view of the pressure plate of FIG. 2a;

FIG. 9b is a section view of the intermediate pressure plate of FIG. 9a;

FIG. 10b is a section view of the intermediate pressure plate of FIG. 10a;

FIGS. 11a–e are partial section views of various possible arrangements for a reinforcing component in fiber form in a pressure plate;

FIG. 13a is a partial plan view of a sectional illustration through a pressure plate with a cylindrical extension formed on it for receiving a leaf-spring bore;

FIG. 13b is a section view of the pressure plate of FIG. 13a;

FIGS. 14a–c are section views of clutch housings, which are partially illustrated.

DETAILED DESCRIPTION OF THE PRESENTLY PREFERRED EMBODIMENTS

Figure 1A:
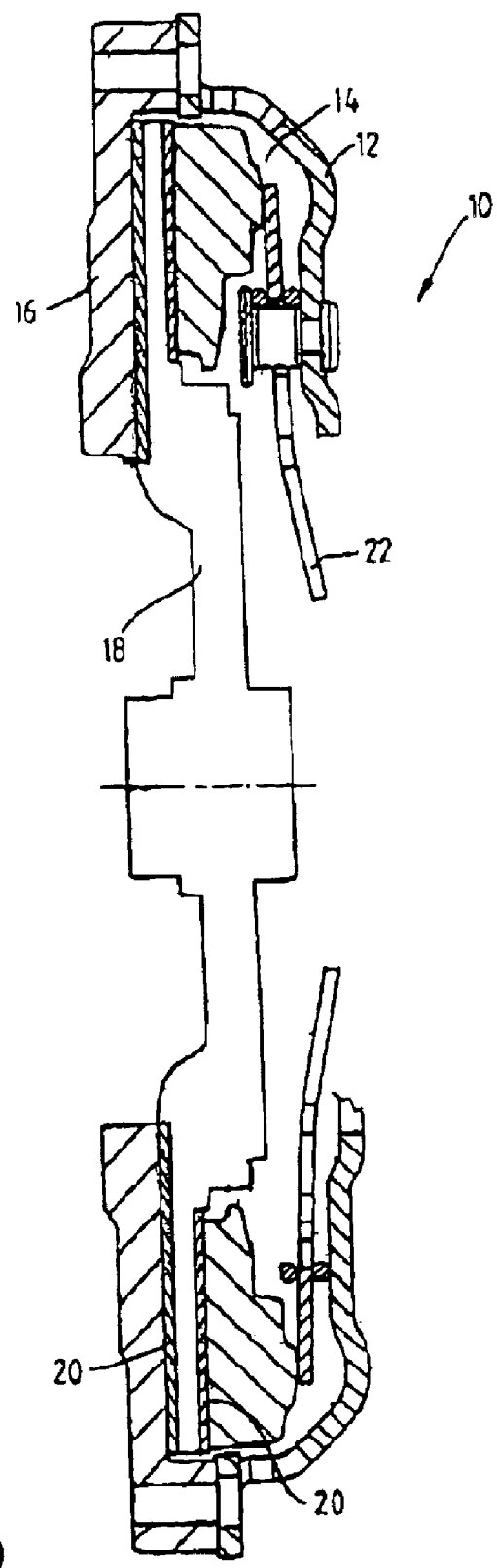
FIG. 1a is a diagrammatic cross-section a friction clutch arrangement.

FIG. 1a first of all shows a standard friction clutch arrangement 10 for motor vehicles. This comprises a clutch housing 12, a first friction plate which forms a pressure plate 14 which is connected in a rotationally fixed manner to the clutch housing 12 and can be displaced in the axial direction therein toward a second friction plate 16, which bears the clutch housing 12 and usually forms the flywheel of an internal combustion engine. A driver disk 18, which has friction linings 20 on both sides, which interact with the friction surfaces formed on the flywheel 16 and on the pressure plate 14, is arranged axially between the flywheel 16 and the pressure plate 14. The friction clutch arrangement 10 also comprises a diaphragm spring 22, by means of which a compressive force for actuation of the clutch arrangement 10 can be applied to the pressure plate 14. The clutch arrangement is completed by parts which are not shown in the drawing, such as a crankshaft, which is connected to the flywheel, of the internal combustion engine, a transmission input shaft of a manual transmission, on which the driver disc, in a rotationally fixed manner, and an axially moveable release system are arranged. The clutch arrangement 10 is therefore suitable for producing or interrupting, as desired, a torque transmission from the internal combustion engine to the manual transmission.

According to a first aspect of the invention, at least one of the friction plates 14, 16 is made at least in part from a metal matrix and at least one nonmetallic foreign phase included in the matrix, which together form a metal matrix composite material. In the example, the metal matrix consists of aluminum or an alloy in which, in addition to the main constituent aluminum, further elements, such as silicon, iron, copper, magnesium, nickel and titanium are also present. The foreign phase is formed by microscopic SiC ceramic particles. However, alloys based on magnesium or titanium are also recommended for the light metal matrix. In general, high-melting oxides, carbides, borides or nitrides, for example $Al_2O_3$, AlN, $B_4C$, $Si_3N_4$, SiC, Sialon, $TiB_2$, $ZrO_2$, can be used as particle reinforcement.

The composite materials mentioned can be cast to form friction plates 14, 16 using numerous casting processes which are already known in principle. Unlike with the conventional material steel or gray cast iron, in this case most of the conventional casting processes, such as for example the pressure die casting process, the gravity die casting process, the sand casting process or the centrifugal casting process, can be used. It has proven particularly advantageous to use the pressure die casting process, since in this way it is already possible to achieve a friction plate which is very near net shape. Therefore, when friction plates 14, 16 are being manufactured from a metal matrix composite material, it is possible to largely eliminate the finish machining required compared to a gray cast iron friction plate.

A production process for metal matrix composite materials which is particularly worthy of note is the thixocasting process, which is based on the thixotropic behavior of partially solid and partially liquid molten material. In this process, an alloy which is initially present in the form of a melt is cooled until it is approximately 40% solidified. During the cooling, the mixture of solid and liquid phase which is present is agitated, in order to break up the dendrites which form during the solidification, while at the same time the ceramic foreign phase is also supplied. The result is a slurry with thixotropic properties which is pressed into a die as a composite casting. As an alternative to a melt, the process can also start from an alloy which is initially in solid form and which is converted into a thixotropic state by being heated.

A heat treatment on a friction plate consisting of a metal matrix composite material can be provided, depending on the particular application for the clutch, if the risk of coagulation, i.e. embrittlement caused by different phases growing together, can be ruled out by having a knowledge of the application temperature.

Figure 1B:
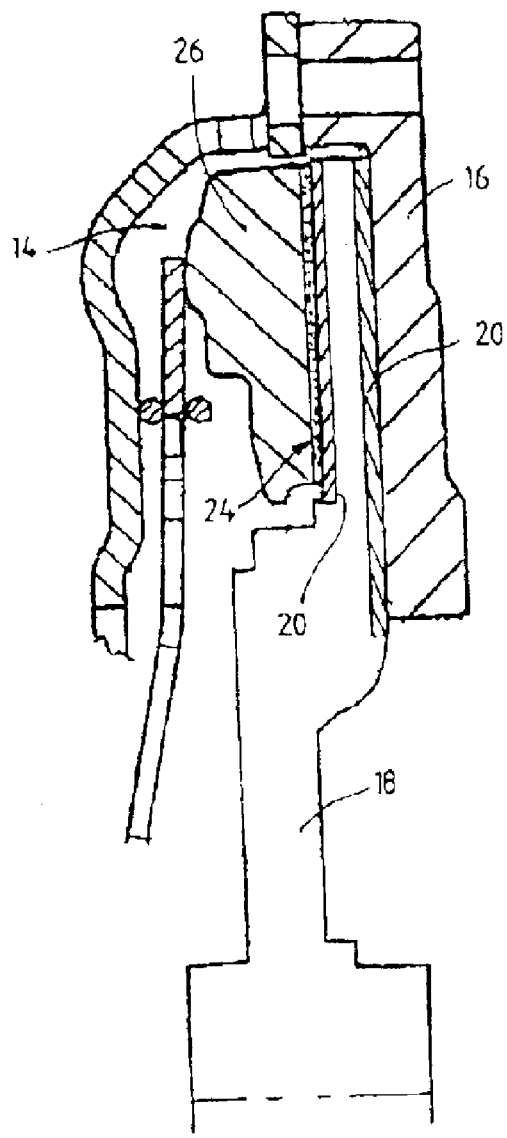

FIG. 1b illustrates an enlarged section of the pressure plate 14 shown in FIG. 1a, which in functional terms is divided into a friction region 24 and a heat-accumulation region 26. The friction region 24 (indicated by dots) is formed by the region of the pressure plate 14 which is close to the surface and interacts with the friction lining 20 of the driver disk 18. Since the pressure plate 14 is subject to wear caused by operating conditions, in an unused friction plate 14, a layer of material which is close to the surface and approximately corresponds to the wearing layer, for example down to a depth of approximately 0.5 to at most approximately 1 mm, is considered to be the friction region 24 in view of a refinement of the invention which is yet to be explained. In the case of a pressure plate which has reached its maximum intended service life, the friction region 24 then consists exclusively of the friction surface thereof. The friction region 24 is adjoined over the entire surface by the heat-accumulation region 26, which first of all rapidly takes up and temporarily stores for a brief period the frictional heat produced in a clutch operation which lasts a short time, in order for this heat, after the clutch operation, to be dissipated again as quickly as possible to adjoining components and the air circulating in the clutch housing 12. The heat-accumulation region 26, which therefore forms almost the entire friction plate 14, at the same time serves as a supporting region for the friction region 24. In the case of a multidisk clutch, the friction plates arranged on the axially inner side are in each case provided with two friction regions 24 with a heat-accumulation region 26 arranged between them.

Given knowledge of the materials properties, it is not necessary to make the entire pressure plate 14 from the metal matrix composite material. Rather, it may even be advantageous for the content by volume of the nonmetallic foreign phase in the friction region 24 to be greater than that in the heat-accumulation region 26. Therefore, on the one hand the wear-inhibiting action of the composite material in the friction region 24 and the very high thermal conductivity of the light metal matrix and its heat-accumulation capacity in the heat-accumulation region 26 can be optimally utilized. In addition, it is therefore expedient for the pressure plate 14 to be formed using the metal matrix composite material only in part, specifically only in the friction region 24, and for the heat-accumulation region 26, apart from a transition region to the friction region 24, to be produced substantially only from the material of the metallic base matrix.

A pressure plate of this type is first of all cast from the material of the metal matrix, for example by using the pressure die casting process, and then, in the heat-accumulation region 26, the ceramic particle reinforcement is introduced by means of a surface treatment in a layer whose extent approximately matches that of the wearing layer, with the result that a metal matrix composite material is formed only in this region close to the surface. All suitable techniques, for example laser powder coating, plasma spraying or other known processes, can be used for the surface treatment. It is also conceivable for the foreign phase to be introduced into the surface of a pressure plate 14 not just in the form of irregularly shaped or, for example, spherical particles, but also as a structure in fiber or woven fabric form, for example by partially melting the pressure plate 14 and then rolling or pressing in a ceramic mesh, e.g. as a woven sapphire fabric. Alternatively, it is possible for a casting mold, at predetermined locations, to be filled with the particles which are intended for reinforcement or configured with the woven fabric, the foreign-phase reinforcement being enclosed by the melt during casting and forming a friction region 24 substantially on the surface of the friction plate 14.

Figure 2A:
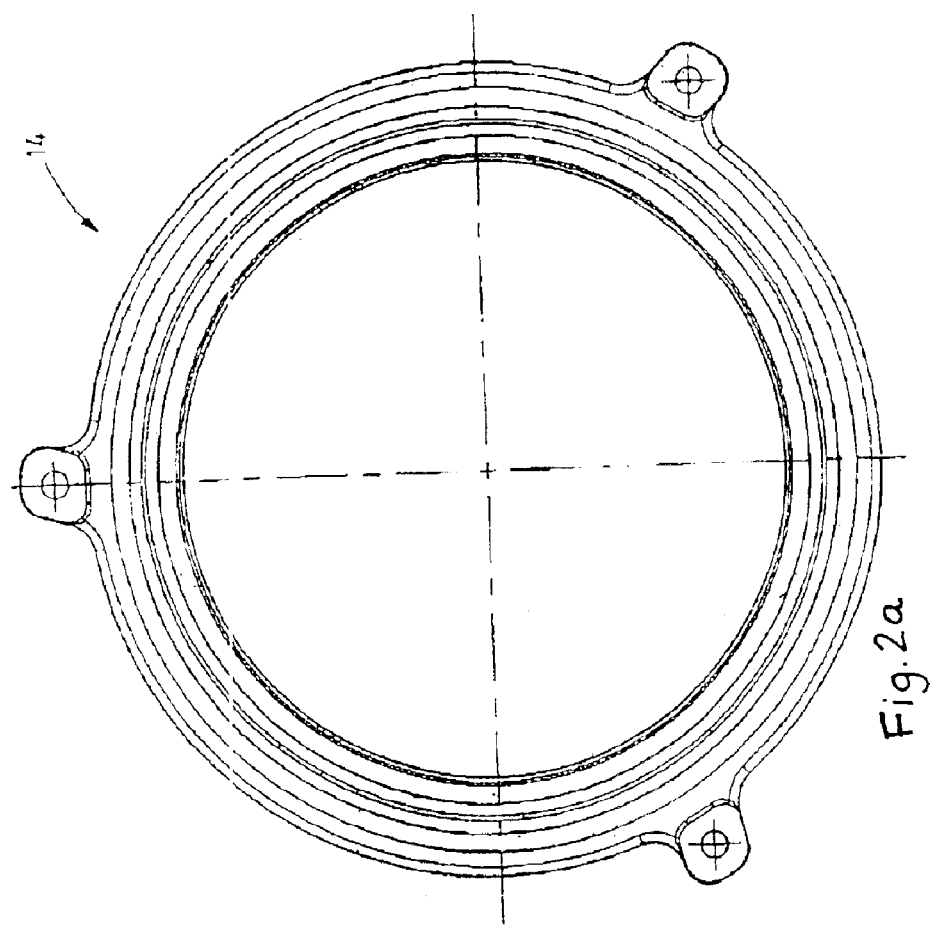
FIG. 2a is a plan view of a friction plate which is designed as a pressure plate.
Figure 2B:

FIGS. 2A and 2B show a pressure plate 14 which differs from conventional pressure plates through the fact the diaphragm-spring-cutting edge 28 is designed as a continuous circle in the circumferential direction. On account of the favorable thermal properties, this design is readily possible with particle-reinforced aluminum, unlike with gray cast iron. The additional mass fractions compared to conventional pressure plates constitute an additional heat-accumulation capacity.

Figure 3:
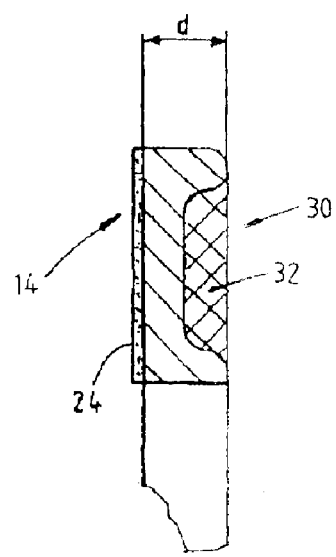
FIG. 3 is an axial section view through a conventional pressure plate by comparison with a pressure plate made from a metal matrix composite material.

FIG. 3 shows a further axial section through a pressure plate 14. The conventional starting model made from gray cast iron (simply hatched) has the thickness d, for rigidity reasons. To save weight, in this case the back 30, which is remote from the friction region 24, of the pressure plate 14 has been designed with a recess 32 (cross-hatch). A pressure plate 14 made from particle-reinforced aluminum has to be designed with an increased volume of material in order to achieve a predetermined heat accumulation capacity. In this case, the recess 32 is filled with the MMC.

Figure 4:
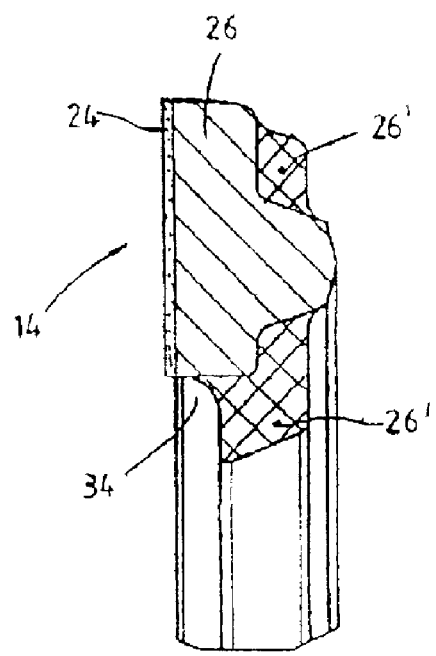
FIG. 4 is an axial section view through a pressure plate made from a metal matrix composite material with additional volumes, compared to a conventional pressure plate, as a heat-accumulation region.

FIG. 4 shows an axial section through a pressure plate 14 made from a metal matrix composite material, in which, compared to a conventional pressure plate (simple hatching), once again further volumes are formed in addition to the heat-accumulation region 26 which was already present, as heat-accumulation regions 26' (cross-hatched). For these regions, first of all the region at the internal diameter 34 of the friction plate 14 is ideally recommended. The additional mass at this position leads to only a slight increase in the mass moment of inertia. Unlike in the case of gray cast iron, the addition of the heat-accumulation region 26 at a distance from the friction surface is possible, on account of the very good thermal conductivity of the metal matrix composite material. However, if, in view of space constraints, it becomes necessary for the heat accumulator 26 to be arranged in the radially outer region of the pressure plate, in this case too such an arrangement is possible on account of the low density of the metal matrix composite material.

Figure 5:
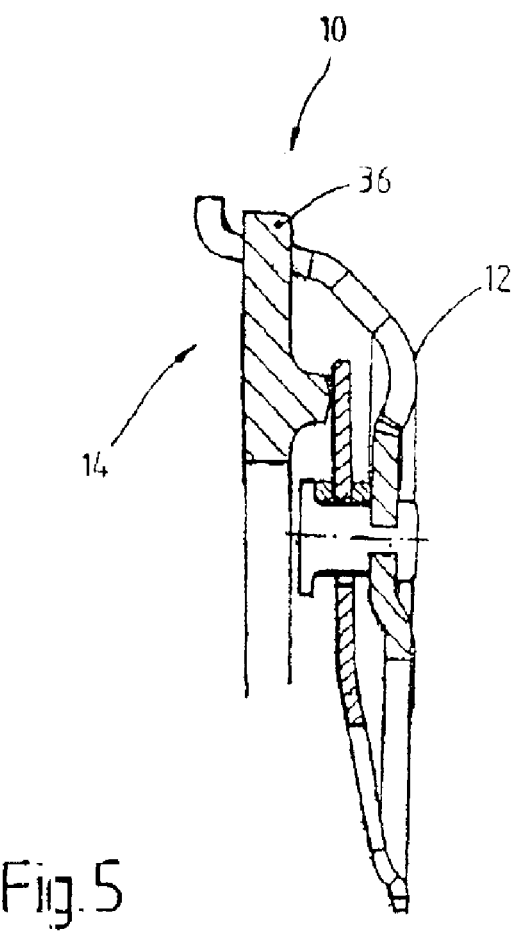
FIG. 5 is a sectional view through a clutch arrangement, with the pressure plate extending radially outwards through the clutch housing.
Figure 6A:
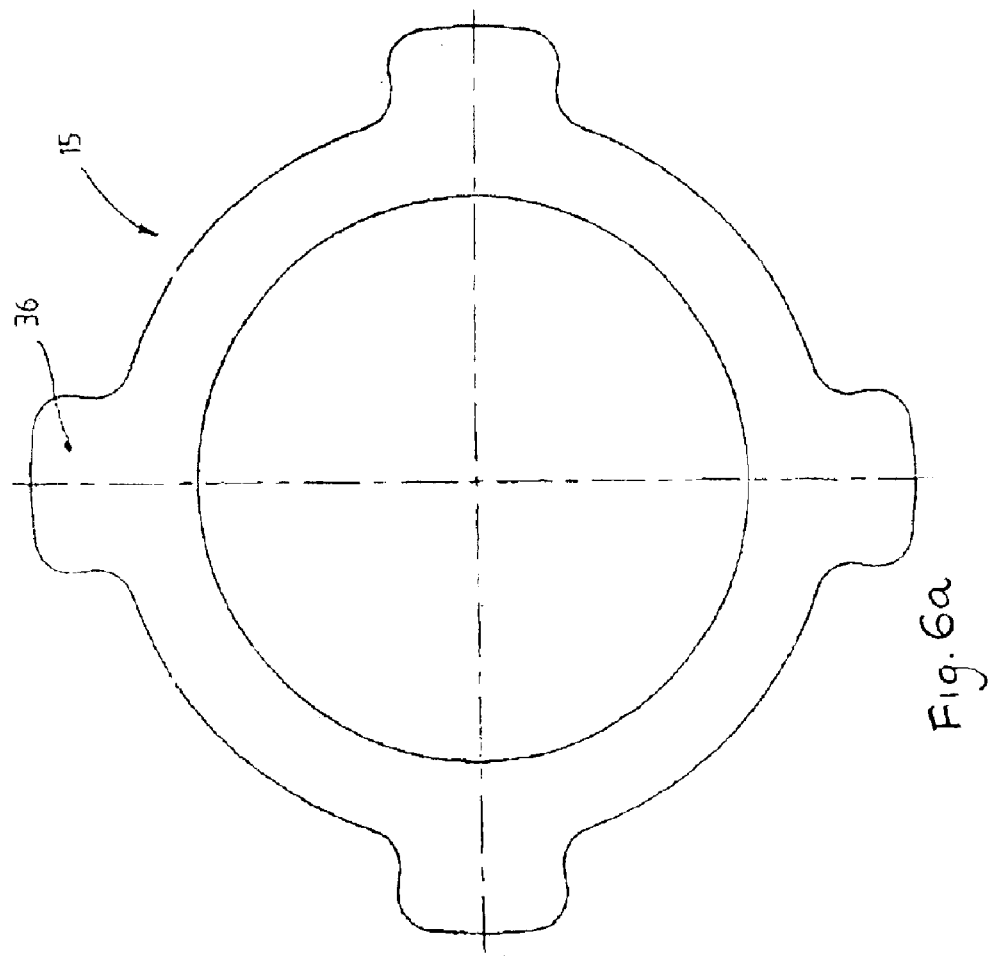
FIG. 6a is a plan view of a pressure plate of a multidisk clutch with radial projections at the outer circumference.
Figure 6B:
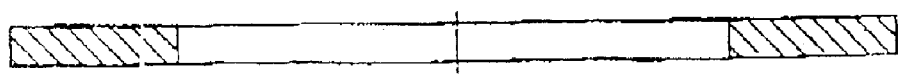
Figure 7:
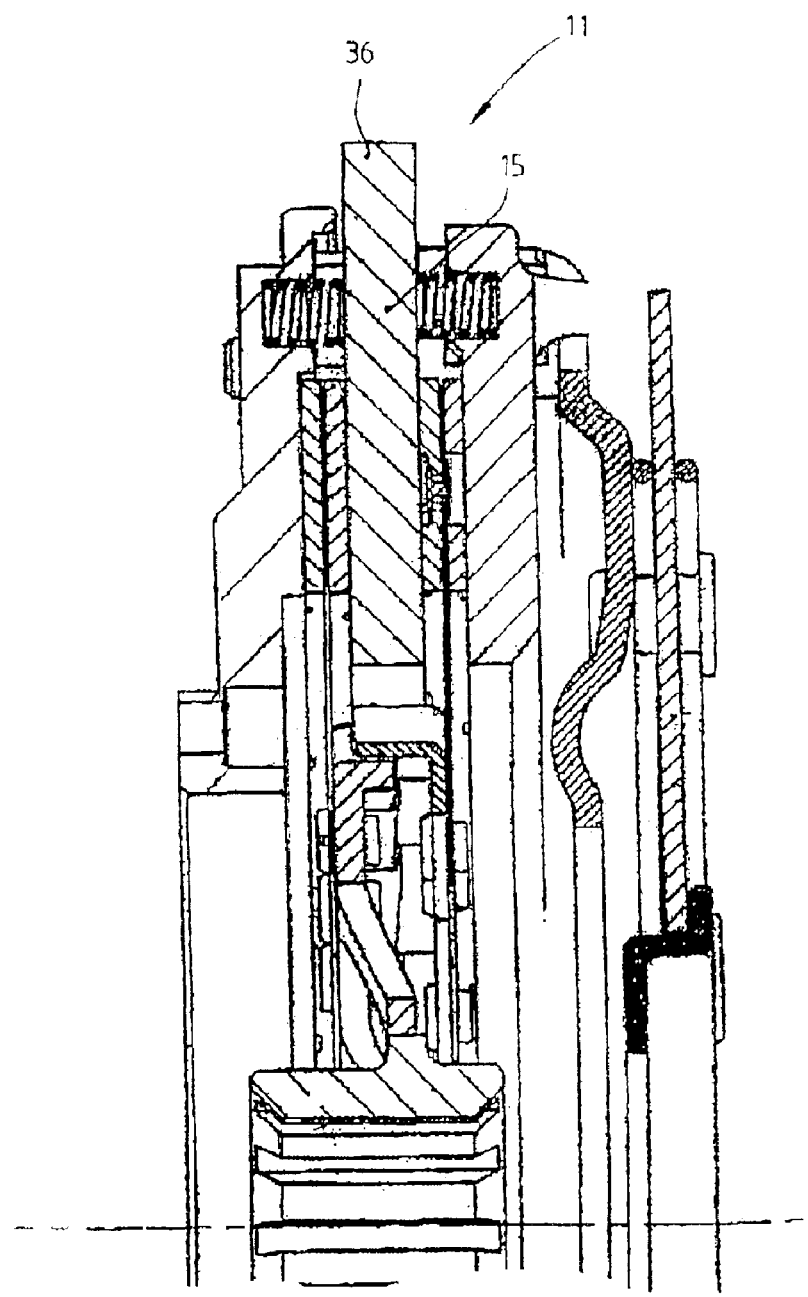
FIG. 7 is a section of a multidisk clutch with a pressure plate as shown in FIG. 5.

FIG. 5 shows a partially sectional illustration of a clutch arrangement 10, with a plurality of radial projections 36, which extend through openings running through the clutch housing 12, being formed on the outer circumference of the pressure plate 14. Therefore, part of the pressure plate 14 lies in the air stream which is circulating in a transmission unit, which is not illustrated in the drawing. The radial projections 36 of the pressure plate, during rotation, therefore form a forced-cooling device and, when the clutch arrangement 10 is operating, experience the maximum possible circumferential velocity, which leads to particularly good cooling of the entire pressure plate 14. Furthermore, it is possible to design that part of the pressure plate 14 which projects through the clutch housing 12 in the form of blades, vanes or similar elements which increase the heat transfer. The configuration of a friction plate 14 which has just been described can, of course, also be transferred to the intermediate pressure plates of a multidisk clutch 11, as illustrated in FIGS. 6 and 7. Intermediate pressure plates in multidisk clutches are subject to particularly high thermal load, on account of the introduction of friction work from both sides. For this purpose, the intermediate pressure plate 15 has four radial projections 36 which, on account of the poor heat uptake, serve as an additional heat-accumulation region 26 and as a ventilation element with a view to achieving likewise rapid dissipation of heat.

Figure 8A:
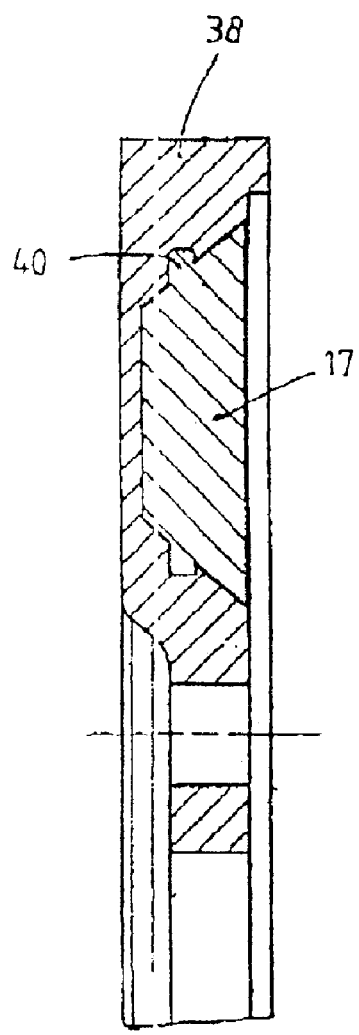
FIG. 8a is a section view through a friction plate which is cast into a flywheel.

FIG. 8a uses a further sectional illustration to show a friction plate 17 which has been cast into a flywheel 38 or into a secondary flywheel, this friction plate 17 being provided, in accordance with the invention, from particle-reinforced aluminum, in order to interact with the friction lining of the driver disk 18. In this case, the friction plate 17 is securely fixed in the flywheel 38 by means of a tenon 40.

Figure 8B:
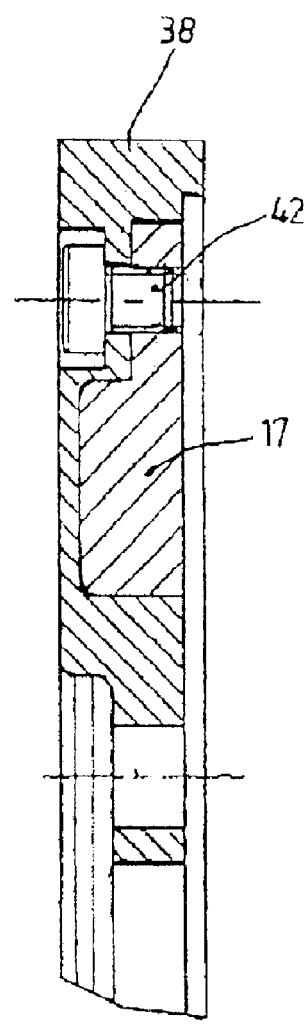
FIG. 8b is a section view through a friction plate which is screwed to a flywheel.

As an alternative, FIG. 8b shows a screw connection 42, which is used to fix the friction plate 17 to the flywheel 38. In this case, the flywheel 38 can be retained in substantially unchanged form made from gray cast iron, in order to obtain the desired high mass moment of inertia. In this case, a riveted connection would also be possible instead of the screw connection.

Figure 9A:
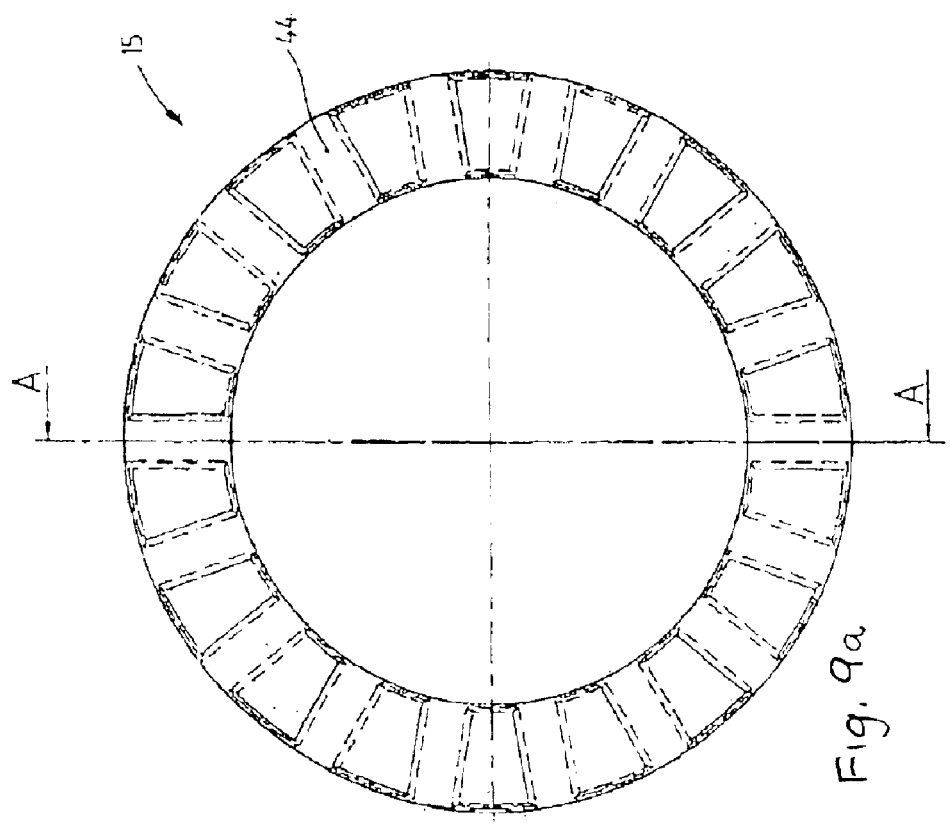
FIG. 9a is a plan view an intermediate pressure plate of a multidisk clutch with recesses for cooling the plate.
Figure 9B:
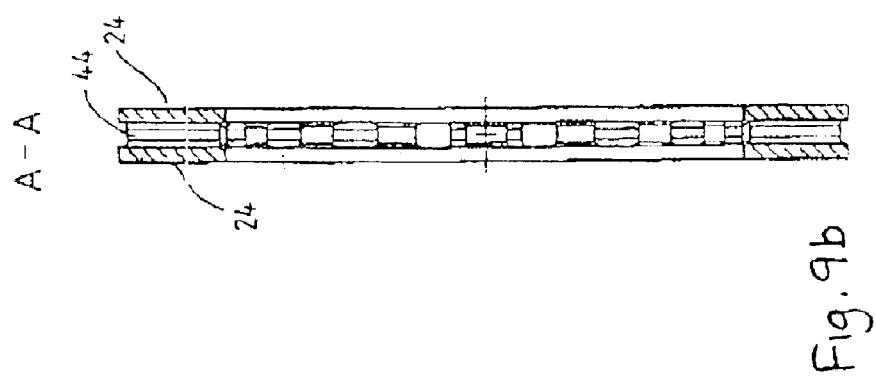
Figure 10A:
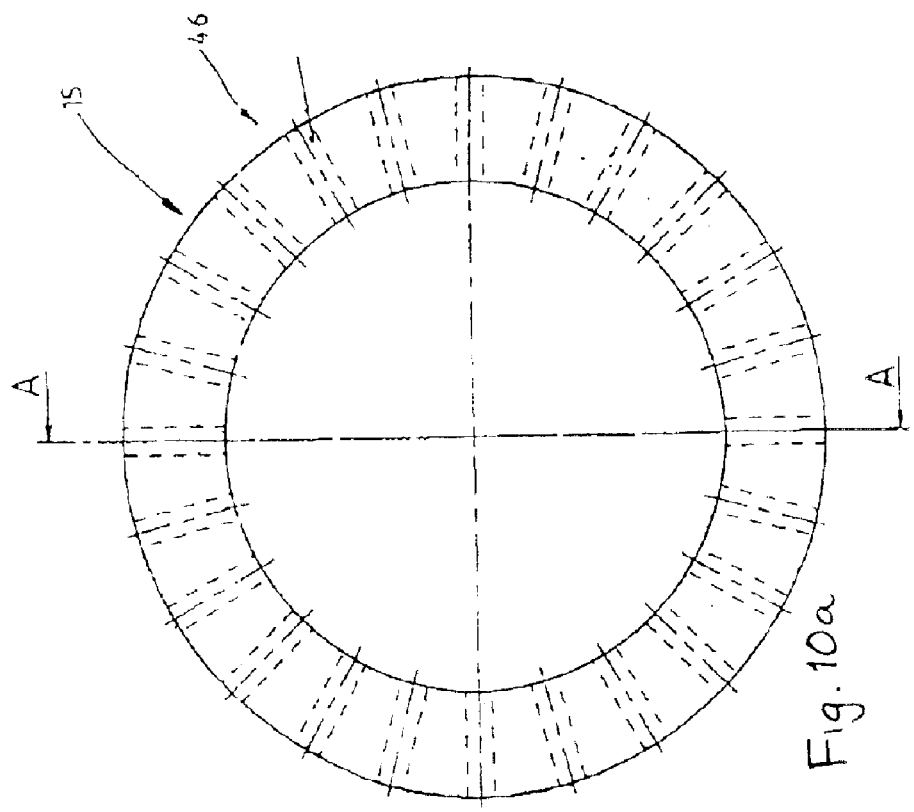
FIG. 10a is a plan view of an intermediate pressure plate of a multidisk clutch with radial bores for cooling the plate.
Figure 10B:
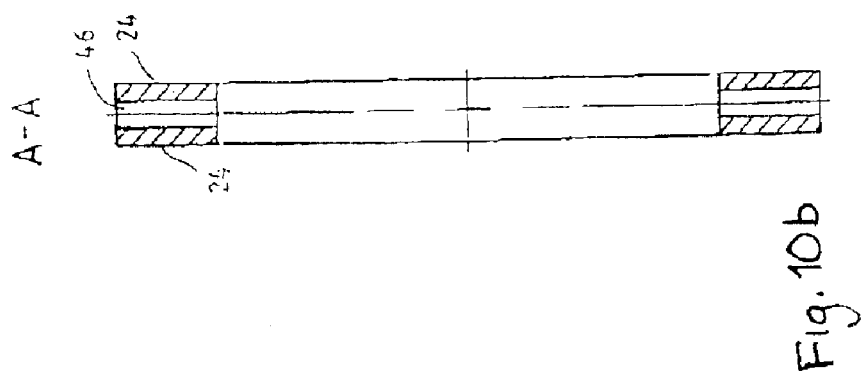

FIGS. 9 and 10 show intermediate pressure plates 15 of a multidisk clutch in which ventilation openings have been formed. In this context, FIG. 9 shows an intermediate pressure plate 15 with recesses 44 in the axially inner region, which are formed between the externally arranged friction regions 24. In FIG. 10, a plurality of radial bores 46 have been introduced into the intermediate pressure plate 15. Alternatively, the ventilation openings may also be formed in such a manner that their longitudinal axis extends outward not in the radial direction but rather helically. As a result, a forced flow through these passages is produced.

As already been mentioned above, the ceramic foreign phase may also be in the form of discrete non-woven fibers in the matrix. FIGS. 11a–e in this context show various possible arrangements for the reinforcing component with respect to the geometry of a pressure plate 14. In this context, it is possible for these fibers to be arranged in a preferred orientation (texture) in the matrix. The orientation of the fibers may in this case be parallel to the friction region 24 (FIG. 11a) or perpendicular to this region (FIG. 11b). FIG. 11c illustrates an irregular directional distribution. It has already been explained that it is advantageous for the volumetric concentration of the phase in the friction region 24 to be higher than that in the accumulation region 26. This fact is diagrammatically indicated in FIGS. 11d and 11e. When a pressure plate 14 is being produced by the pressure die casting process, the fiber orientation can be influenced by means of the design of the sprue, especially its size and position, and the tensile and compressive stresses which result in the molten material. A change in the concentration of the foreign phase fraction over the extent of the friction plate 14 (a graduation) can be achieved, for example, if the cast component is held in the molten state for a prolonged period, so that the fibers adopt a distribution gradient under a force field, e.g. that of gravity or centrifugal force. In this way, a graduation can also be established in the case of a foreign phase in particle form.

Figure 12:
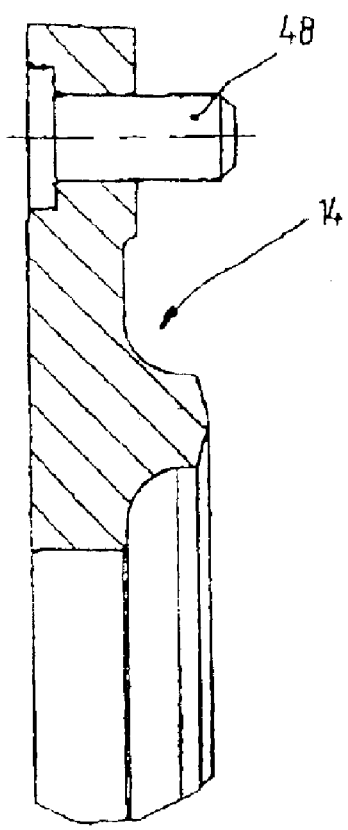
FIG. 12 is a section view through a pressure plate with a stud bolt cast into it.

FIG. 12 shows a further pressure plate 14, during the production of which, for example by means of pressure die casting or sand casting, at the same time a plurality of stud bolts 48 have been cast in at the outer circumference of the pressure plate 14 in order to receive a leaf-spring bore (not shown).

Figures 13A, 13B:
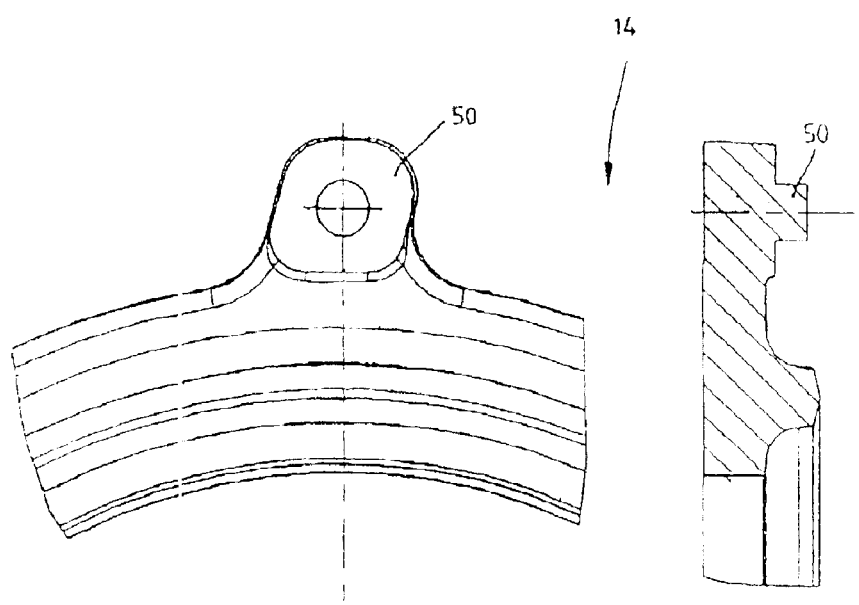
Figure 15:
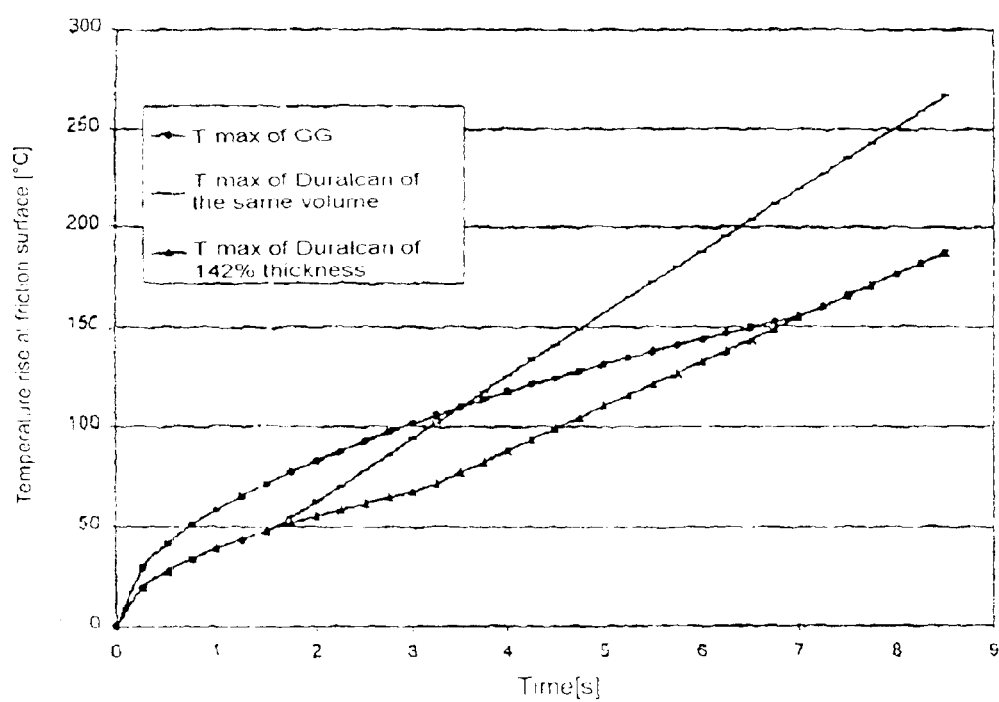
FIG. 15 is a plot of surface temperature vs. friction time in an automotive clutch.

Forming a pressure plate from a metal matrix composite material and the use of the pressure die casting or sand casting process, in a refinement as shown in FIG. 13, now also enables a plurality of cylinder extensions 50 for receiving a leaf-spring bore to be formed directly from the composite material. After a leaf spring has been put in place the collar of the cylindrical extension is plastically deformed in order to fix the spring in place.

Compared to unreinforced aluminum, particle-reinforced aluminum has a significantly higher modulus of elasticity. Therefore, it is possible to produce a lightweight yet strong housing from the metal matrix composite material in a simple way using the pressure die casting process. In connection with the material and production processes used, reference is made to the statements which have been given in connection with friction plates to the extent that they also apply in the present context. To further reduce weight and increase strength, the pressure die casting process can easily be used to introduce reinforcing ribs 52 into a clutch housing 12, as has been illustrated, by way of example, with reference to FIG. 14a.

FIG. 14b shows a section from the radially outer region of a conventional clutch housing 12 which is made from a steel sheet and has bores 54 in the radially outer region. In this case, a bore 54 comprises a bearing surface 56 for a screw head (not shown), which is intended to screw the housing 12 to a flywheel of an internal combustion engine. If the clutch housing 12 is made from a metal matrix composite material using the pressure die casting process, it is possible to produce an accumulation of material 58, in which a screwhead-bearing region 60 and a screw-shrank receiving region 62 are formed, in the radially outer region of the housing. This results in the advantage that the bore 54 for receiving the screw connection can be offset radially inward by an amount Y, since more space is available for the screw head bearing in the outer region than in the conventional design shown in FIG. 14b. This offset makes it possible to reduce the housing outer radius by an amount X, with the result that space is saved. Alternatively, it is possible to maintain the same housing outer radius and to increase the size of the clutch interior which can be utilized. It is then possible for a driver disk of increased diameter and also larger friction plates to be arranged in this clutch interior, resulting in an increase in the central friction radius and therefore an increase in the torque which can be transmitted via the clutch.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or bed or suggested form or embodiment as a general matter of design choice. It is intention, therefore, to be limited only as indicated by the scope of the claims appended hereto.

We claim:

1. A friction clutch assembly comprising:
   a clutch housing,
   at least one first friction plate in said housing, said first friction plate being rotationally fixed and axially displaceable with respect to said clutch housing, said first friction plate having a friction region and a heat accumulation region;
   a second friction plate bearing the clutch housing, said second friction plate having a friction region and a heat accumulation region;
   at least one driver disk arranged axially adjacent to the at least one first friction plate and the second friction plate and having oppositely facing friction linings which interact with the adjacent friction plates; and
   a spring which loads the at least one friction plate toward the second friction plate;
   wherein at least one of said friction plates is made at least in part of a metal matrix composite material comprising a metal matrix and at least one nonmetallic foreign phase in the form of discrete non-woven fibers included in the matrix.

2. A friction clutch assembly as in claim 1 wherein the metal matrix is formed from one of a light metal and a light metal alloy, based on at least one of the elements aluminum, magnesium and titanium.

3. A friction clutch assembly as in claim 1 wherein the foreign phase is a refractory material comprising at least one of an oxide, a carbide, a boride and a nitride.

4. A friction clutch assembly as in claim 1 wherein at least one said friction region has a content by volume of the nonmetallic foreign phase which is greater than that in the respective heat-accumulation region.

5. A friction clutch assembly as in claim 1 wherein at least one of said friction plates forms an intermediate pressure plate having a plurality of recesses which form a cooling structure.

6. A friction clutch assembly as in claim 1 wherein at least one of said friction plates is produced using a casting process.

7. A friction clutch assembly as in claim 6 wherein the casting process is one of a pressure die casting process, a gravity die casting process, a sand casting process, a centrifugal casting process and a thixocasting process.

8. A friction clutch assembly as in claim 1 wherein at least one said friction region is produced by a surface treatment of the respective heat-accumulation region.

9. A friction clutch assembly in claim 1 wherein the second friction plate is secured to a flywheel.

10. A friction clutch assembly as in claim 9 wherein the second friction plate is cast to the flywheel.

11. A friction clutch assembly as in claim 1 wherein one of said first friction plates comprises a circular ridge which forms a diaphragm-spring cutting edge.

12. A friction clutch assembly as in claim 1 wherein at least one of said friction plates comprises at least one friction region having an inside diameter and a heat-accumulation region, said heat-accumulation region extending radially inward from the inside diameter of the friction region.

13. A friction clutch assembly as in claim 1 wherein at least one said first friction plate has an outer circumference formed with a plurality of radial projections which extend through openings in the clutch housing to form a forced cooling device.

14. A friction clutch assembly as in claim 1 wherein at least one said first friction plate comprises a cast rivet stud for receiving a leaf spring bore.

15. A friction clutch assembly as in claim 1 wherein said fibers are all oriented substantially in parallel.

16. A friction clutch assembly as in claim 15 wherein said fibers are all oriented substantially parallel to said friction region.

17. A friction clutch assembly as in claim 15 wherein said fibers are all oriented substantially perpendicular to said friction region.

18. A friction clutch assembly comprising:
   a clutch housing,
   at least one first friction plate in said housing, said first friction plate being rotationally fixed and axially displaceable with respect to said clutch housing;
   a second friction plate bearing the clutch housing;
   at least one driver disk arranged axially adjacent to the at least one first friction plate and the second friction plate and having oppositely facing friction linings which interact with the adjacent friction plates; and
   a spring which loads the at least one friction plate toward the second friction plate;
   wherein said clutch housing is made at least in part of a metal matrix composite material comprising a metal matrix and at least one nonmetallic foreign phase included in the matrix.

19. A friction clutch assembly as in claim 18 wherein the metal matrix is formed from one of a light metal and a light metal alloy, based on at least one of the elements aluminum, magnesium and titanium.

20. A friction clutch assembly as in claim 18 wherein the foreign phase is a refractory material comprising at least one of an oxide, a carbide, a boride and a nitride.

21. A friction clutch assembly as in claim 18 wherein the foreign phase is incorporated in the metal matrix in the form of fibers.

22. A friction clutch assembly as in claim 21 wherein the fibers in the metal matrix are all oriented substantially in parallel.

23. A friction clutch assembly as in claim 21 wherein the fibers form a woven fabric-like structure.

24. A friction clutch assembly as in claim 18 wherein said clutch housing is produced using a casting process.

25. A friction clutch assembly as in claim 24 wherein the casting process is one of a pressure die casting process, a gravity die casting process, a sand casting process, a centrifugal casting process and a thixocasting process.

26. A friction clutch assembly as in claim 18 wherein the clutch housing has reinforcing ribs.

27. A friction clutch assembly as in claim 18 wherein the clutch housing has a radially outer region formed of accumulated material in which a screw-head-bearing region and a screw-shank-receiving region are formed.

* * * * *